United States Patent [19]
Llop et al.

[11] 3,751,168

[45] Aug. 7, 1973

[54] INDICATING APPARATUS FOR THE VARYING CONCENTRATION OF A SOLUTION

[75] Inventors: Helenio Llop, Creteil; Pierre Lefort, Fontenay-sous-Bois, both of France

[73] Assignee: Societe D'Optique Precision, Electronique et Mecanique-Sopelem, Paris, France

[22] Filed: May 11, 1971

[21] Appl. No.: 142,276

[52] U.S. Cl.................. 356/135, 356/136, 250/202
[51] Int. Cl......................... G01n 21/46, G05b 1/00
[58] Field of Search..................... 356/135–137, 133; 250/201, 202

[56] References Cited
UNITED STATES PATENTS

| | | | |
|---|---|---|---|
| 2,999,161 | 9/1957 | Lovoff | 250/202 |
| 3,323,410 | 6/1967 | Waters | 356/136 |
| 2,747,455 | 5/1956 | Spracklen et al. | 356/132 |

Primary Examiner—Ronald L. Wibert
Assistant Examiner—Conrad Clark
Attorney—Cameron, Kerkham & Sutton

[57] ABSTRACT

There is described an apparatus for producing an electrical signal related to the varying concentration of a solution, for example a sugar solution. Light is inclinedly directed upon a surface of a prism which is in contact with the solution, so that light falling on one side of a boundary line, the position of which is a function of the concentration of the solution, is transmitted into the solution while light falling on the other side of this boundary line is totally reflected. The reflected light is directed towards an assembly including two photocells which are spaced apart in the direction of movement of the boundary as the solution concentration varies. The outputs of the two photocells are combined in a difference amplifier to yield a signal denoting that the solution concentration has reached a predetermined value dependent upon the position in said direction of movement to which the assembly is adjusted.

1 Claim, 3 Drawing Figures

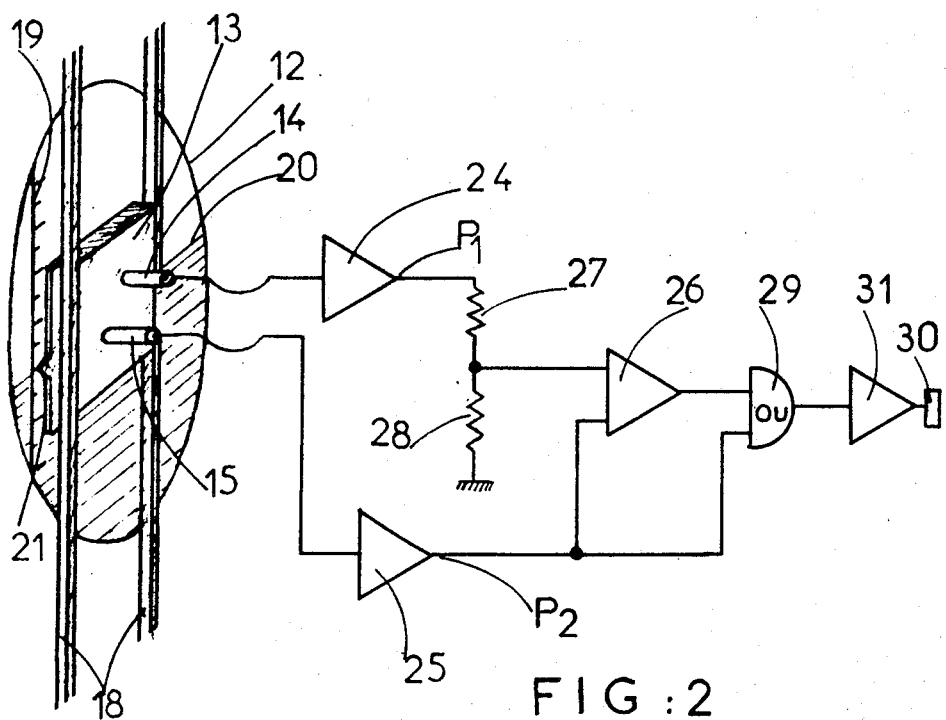
FIG:2
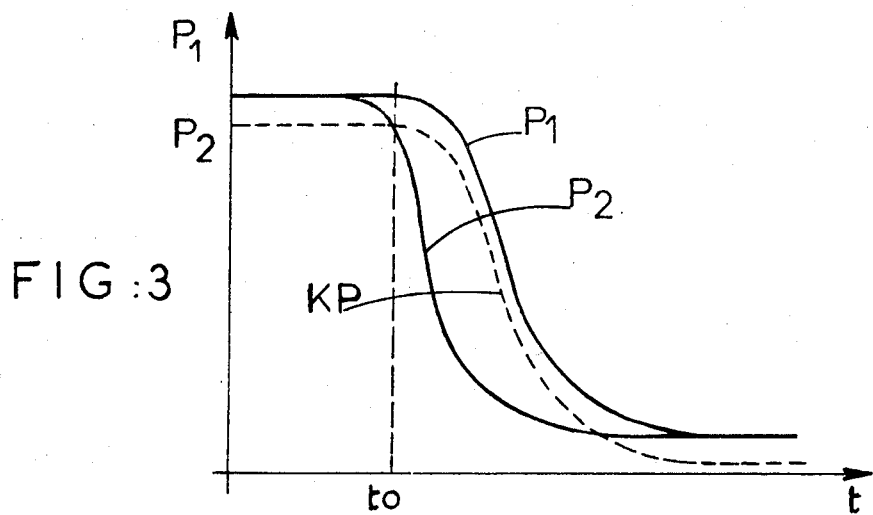
FIG:3

INDICATING APPARATUS FOR THE VARYING CONCENTRATION OF A SOLUTION

The invention relates to apparatus for obtaining an electric signal related to the concentration of a solution, more particularly, for example, for permitting the change in the sugar concentration of a juice to be followed during cooking, and for producing a signal when this concentration has reached a predetermined value.

The variation in the concentration of a solution is accompanied, of course, by a corresponding variation in the optical refractive index for this solution. This property is used in a known manner in a refractometer, in which a light beam is projected upon an interface formed by the plane surface of a prism in contact with the solution which is to be analysed. If the incident beam forms with the interface between the two media an angle close to the limiting angle of total refraction of the "dioptre," any variation in the refractive index of the solution will be accompanied by a variation in this limiting angle, and the angular position of the limit of the reflected beam will vary in the same way. With an appropriate optical system it is possible to form on the screen an image of this boundary line forming the frontier between the dark zone and the zone illuminated by the impact of the reflected beam.

By means of apparatus of this type the changes in the concentration of a solution, for example during cooking, can be followed by monitoring the position of the image of the boundary of a light beam which has undergone total reflection in a prism of which one face is in contact with the solution.

In practice it is more important during cooking to follow the change in the concentration in the region of a predetermined rate of change than to measure the concentration itself. For this reason the variation in the movement of the image of the boundary on the screen must be monitored continuously, in order to discover when it enters a zone characteristic of a certain stage in the cooking of the solution.

With the invention continuous monitoring of the movement of the boundary may be unnecessary because an alarm is operated when the boundary reaches a predetermined position on the screen.

The invention relates to apparatus using total reflection of a light beam at the plane surface of a prism in contact with the solution which is to be analysed, an optical image of the edge of the reflected beam being formed on a screen.

According to the present invention, there is provided apparatus for producing an electrical signal related to the concentration of a solution, comprising means for directing light inclinedly upon a plane surface of a prism, said surface being arranged to be in contact with said solution, and for directing light reflected internally from said surface towards two photoelectric cells having a separation in the direction in which the boundary formed by the limit of the totally reflected light moves as the concentration of said solution varies, the outputs of said cells being connected to means for deriving a signal related to the varying illumination of said cells.

In a preferred embodiment of the invention, the output signal from the amplifier and comparator assembly is applied to energize an alarm device.

The invention will now be described in more detail with reference to a particular embodiment, given by way of example and illustrated in the accompanying drawings, of which:

FIG. 2 illustrates diagrammatically the arrangement of the movable assembly carrying the photoelectric cells, and includes an operating diagram for the electronic amplifier and comparator assembly connected to these two cells, and FIG. 3 is a graph illustrating qualitatively the variation in the signals from the cells when the image of the boundary on the screen is close to the cells.

Figure 1:
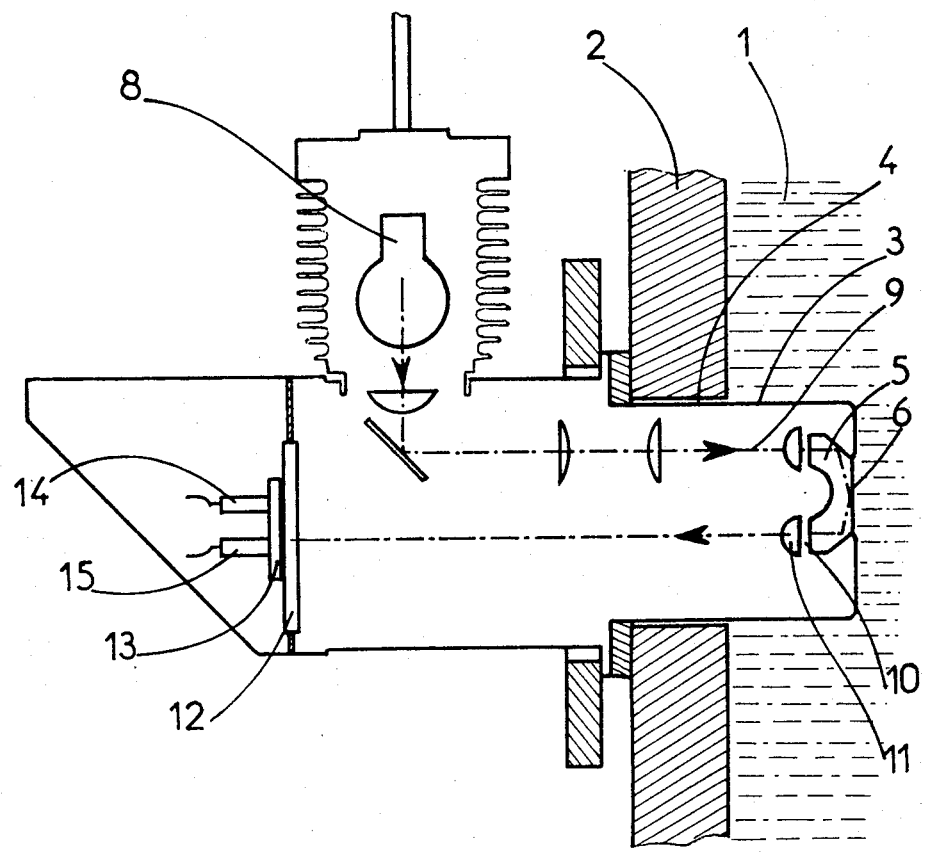
FIG. 1 is a simplified longitudinal section through a refractometer which is used to monitor continuously the cooking of sugared juice in jam-making and which includes indicating apparatus embodying the invention.

As is shown in FIG. 1, a solution 1 of which the change in concentration is to be monitored is contained in a cooking vessel 2. The refractometer used for this purpose comprises a cylindrical element 3 introduced into the solution 1 through an orifice 4 in the vessel. The immersed end of the cylindrical portion 3 is provided with an optical prism block 5 of which a plane surface 6 forms part of the end of the cylindrical portion. The apparatus also comprises a light source 8 and a lens and mirror assembly which directs an incident light beam 9 on to the prism 5. Inside the prism, after a first total reflection, the light rays strike that surface of the prism which is in contact with the solution at varying angles of incidence. The refractive index of the liquid varies according to the rate of change of the concentration, modifying the critical angle of total reflection at the prism face 6. After a second total reflection in the prism, the reflected beam 10 passes through a lens 11 and forms on a translucent screen 12 a boundary image comprising a dark zone and a light zone on this screen. The position of the boundary line on the screen varies when the concentration of the solution changes.

On the other side of the screen 12, the apparatus comprises a movable carriage 13 mounted for movement parallel to the screen. This carriage supports two photoelectric cells 14, 15 of which the sensitive portions are filiform and are directed towards the screen, parallel to the boundary line. The photocells have a separation in the direction in which the boundary formed by the limit of the totally reflected light rays moves as the concentration of the solution varies. Specifically, the cells 14, 15 are slightly offset relative to one another in respect of their height as well as laterally. The relative illumination of the two photocells thus varies when the projected image of the boundary approaches and passes over one of the cells.

FIG. 2 illustrates diagrammatically guide members 18 for guiding the movement of the carriage 13 bearing the cells 14, 15. A reference scale 19 which is preferably associated with the screen 12 is arranged with its length perpendicular to the direction of the boundary 20. The carriage 13 bears a pointer 21 so that the carriage position can be set relative to the scale 19.

It will be apparent that while screen 12 is advantageous for optical observation of the concentration of the solution it becomes unnecessary when it is merely required to obtain an electrical signal and may then be omitted. Similarly a scale need be provided only when adjustment of the concentration at which an alarm signal is given is a requirement. When predetermined conditions for obtaining an alarm signal are known the adjustments may be omitted and the photocells fixedly related to the prism.

The cells 14, 15 are connected to respective amplifiers 24, 25. The output signal from the amplifier 25 is fed to one input of a comparator 26; the other input of this comparator receives the output signal from the amplifier 24 by way of a voltage divider comprising resistors 27, 28. The output signal from the comparator 26 is fed to an OR gate 29, which also receives directly the output signal from the amplifier 25.

The output signal from OR gate 29 operates a warning lamp or audible alarm 30 by way of an amplifier 31.

In order to monitor automatically the change in the concentration of the solution 1 in the cooking vessel 2, the position of the slider 13 will be adjusted so that its pointer 21 points to the graduation on the scale 9 corresponding to the desired concentration. If $P_1$ is the signal received at the output of the amplifier 24 and corresponding to the brightness level detected by the cell 14, and $P_2$ is the output signal from the amplifier 25 for the cell 15, the voltage divider 27, 28 applies to the signal $P_1$ a reduction coefficient K (K being less than 1). The comparator 26 therefore receives the signal $KP_1$ and the signal $P_2$ simultaneously, and it is set to yield an output signal when the signal $P_2$ becomes less than the signal $KP_1$. Assuming that in the course of cooking the variation in concentration has the effect of shifting the boundary 20 upwards in FIG. 2, the dark zone will reach first the cell 15 and then the cell 14, and the signal $P_2$ will begin to diminish before the signal $P_1$.

The graph given in FIG. 3 provides a qualitative indication of the variation with time of the signals $P_1$ and $P_2$. It also shows the value $KP_1$ fed to the comparator 26. A similar curve will be obtained, of course, if the time co-ordinate is replaced by a co-ordinate representing the relative position of the boundary 20 relative to the pointer 21 of the carriage 13. As the graph shows, the comparator 26 changes its state at the instant $t_o$ at which the signal $P_2$ drops below the signal $KP_1$. The voltage divider 27, 28 may therefore be employed to adjust the zero condition of the apparatus. The change of state of the comparator 26 at instant $t_o$ brings the alarm 30 into operation. The OR gate 29 will be closed by the signal $P_2$ as soon as the latter becomes weak enough, that is, as soon as the boundary is completely out of range of the two cells 14, 15.

Obviously, the invention is not strictly limited to the single embodiment described by way of example, but also covers other embodiments which differ from it only in detail.

What we claim is:

1. Apparatus for measuring and comparing the concentration of a solution comprising a prism in contact with the solution, means for directing a beam of light on said prism for total refraction therein, a screen receiving an optical image of the boundary formed by the limit of the refracted light, a carriage movably mounted behind said screen, a graduated scale indicating the position of said carriage, means for guiding said carriage in movement in a direction parallel to the plane of displacement on said screen of the refracted beam, two spaced photoelectric cells mounted on said carriage receiving the refracted beam, one of said cells being electrically connected through an amplifier to an electric signal comparator and furnishing a first signal thereto, the other of said cells being electrically connected through an amplifier and a voltage divider to said comparator providing a second reduced signal thereto differing from said first signal by a constant coefficient, said comparator changing state when said first and second signals are equal and an alarm actuated by the change of state of said comparator.

* * * * *

UNITED STATES PATENT OFFICE
CERTIFICATE OF CORRECTION

Patent No. 3,751,168          Dated August 7, 1973

Inventor(s) Helenio Llop and Pierre Lefort

It is certified that error appears in the above-identified patent and that said Letters Patent are hereby corrected as shown below:

[30] FOREIGN APPLICATION PRIORITY DATA   June 23, 1970 - France - PV 7023157, omitted.

Signed and sealed this 18th day of December 1973.

(SEAL)
Attest:

EDWARD M. FLETCHER, JR.          RENE D. TEGTMEYER
Attesting Officer                Acting Commissioner of Patents